Dec. 1, 1964

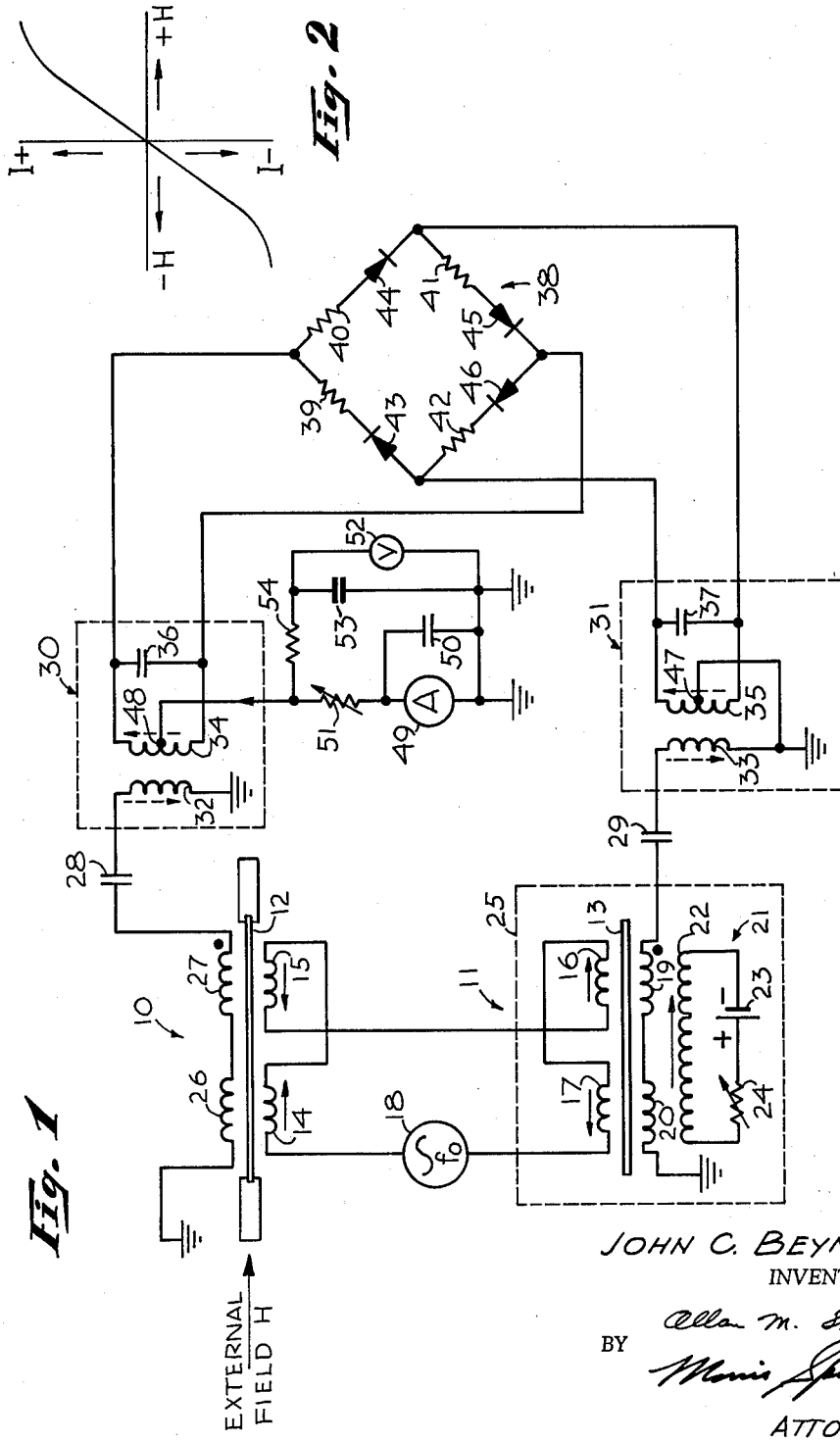

J. C. BEYNON 3,159,785

SECOND HARMONIC MAGNETOMETER HAVING A PLURALITY OF
TRANSDUCERS IN COMBINATION WITH MEANS RESPONSIVE
TO FLUX AMPLITUDE AND DIRECTION

Original Filed May 19, 1960

JOHN C. BEYNON
INVENTOR.

BY Allan M. Shapiro

ATTORNEYS

United States Patent Office 3,159,785
Patented Dec. 1, 1964

3,159,785
SECOND HARMONIC MAGNETOMETER HAVING A PLURALITY OF TRANSDUCERS IN COMBINATION WITH MEANS RESPONSIVE TO FLUX AMPLITUDE AND DIRECTION
John C. Beynon, Los Angeles, Calif., assignor, by mesne assignments, to The Bunker-Ramo Corporation, Stamford, Conn., a corporation of Delaware
Continuation of application Ser. No. 30,157, May 19, 1960. This application Mar. 14, 1962, Ser. No. 182,151
17 Claims. (Cl. 324—43)

The present invention relates to magnetic field detectors, and, more particularly, to new and improved flux-gate magnetometers including such magnetometers of the differential type, sometimes called "gradiometers." This application is a continuation of my copending application, Serial Number 30,157, filed May 19, 1960, and now abandoned.

Generally, a flux-gate magnetometer is essentially a magnetic amplifier in which the saturable reactor device is controlled by the magnetic field to be measured rather than by an electric current or voltage to be amplified. The second-harmonic-type flux-gate magnetometer has been found to have particular utility in measuring the intensity and changes in intensity of the earth's magnetic field. Whereas magnetic amplifiers may have saturable elements presenting either "open" or "closed" magnetic circuits, the directional nature of the external magnetic fields desired to be measured necessitates the use of an "open" magnetic circuit in second-harmonic type flux-gate magnetometers, the saturable element generally being in the shape of a rod having a longitudinal dimension greatly exceeding the lateral dimensions.

It has been the practice in the past to use two parallel saturable elements exposed to the external field, each having a single driver winding and a signal output winding arranged so that, in the absence of an external field, the output signals will be symmetrical and in phase opposition so as to balance each other out, whereas, in the presence of an external field, the output signals become asymmetrical and a second-harmonic voltage appears as the output. Naturally, one of the severest problems associated with such flux-gating designs is that of matching the saturable elements so as to have identical magnetic properties.

Recent investigations of the sources of noise and poor dynamic range in magnetic amplifiers employing amplitude detection have resulted in several significant findings. The inherent noise (Barkhausen hiss) in a flux-gating system can be reduced by increasing the switching rate to more than two hundred kilocycles per second (i.e., the frequency of the driving source). Improvement in the linearity of the transfer characteristic was also noted with such increased switching rate.

In order that the driving source shall not require excessive power, it is desirable to employ a sensing element of very small cross-section. This is also desirable from the standpoint of physical size since the length-to-cross-section ratio determines the flux density at the center of the strip when the strip lies in a given field intensity. Thus, as the cross-section is reduced, the length requirements also are reduced. For optimum performance, i.e., maximum dynamic range, it has been found that the length-to-cross-section ratio desirably should be such that the maximum field to be measured yields a flux density at the center of the strip which is about two-thirds of the saturation flux density. Naturally, as the strip cross-section is reduced, the signal due to the external field will also decrease at a given switching rate. However, this signal loss can be compensated by increasing the step-up turns ratio in a subsequent output band-pass filter or amplifier which is tuned to an even harmonic of the driver frequency, such amplifier being described more fully later. At a given switching rate, the lower limit of cross-section will be that at which the switching power approaches the resistive loss in the driver coils. Further decrease in cross-section will then reduce the output signal otherwise available with optimum matching in the tuned output filter.

It was found that, with high frequency switching and small cross-section of the material, the two driver-windings normally required for proper flux-gating could be placed on one sensory element with air path return for the flux with very little loss of driver efficiency. Since the uniformity throughout a single element can be closely controlled, the problem of having matching elements with identical magnetic properties is practically eliminated.

The present invention is related primarily to novel and improved phase comparison, phase detection and feedback arrangements for second-harmonic type flux-gate magnetometers employing saturable elements in accordance with the above-noted findings and even higher driving frequencies. Prior attempts at phase detection in flux-gate magnetometers have suffered from several serious defects including, for example, complexity in obtaining the reference phase, quadrature distortions due to phase shift with amplitude, and discontinuity or non-linearity of the transfer characteristic at the point of zero crossing.

Therefore, it is one of the objects of the present invention to provide a flux-gate magnetometer of the second-harmonic type with a simple and accurate phase reference for phase detection of sensed external fields.

It is another object of this invention to provide a second-harmonic type flux-gate magnetometer with a single external-field sensing transducer for elimination of element-matching problems.

Another object of this invention is the provision of a second-harmonic type flux-gate magnetometer with an extended dynamic range and capable of very high gain.

It is a further object of this invention to provide improved magnetometers of the differential field or gradiometer type.

A still further object of this invention is the provision of a novel gradiometer having a fast response time.

Another object of this invention is to provide a phase detecting gradiometer with novel feedback arrangements for greatly increased sensitivity to external field changes within a selected range of rate of change.

A further object of this invention is the provision of a phase-detecting gradiometer with a wide bandpass and frequency-selective feedback arrangements.

Another object of this invention is to provide a magnetometer having a single sensing transducer and a frequency-selective feedback arrangement whereby the effective output sensitivity is restricted to a selected spectrum of rates-of-change of the sensed magnetic field density and/or direction.

An additional object of this invention is the provision of magnetometers and gradiometers with combinations of means for phase detection and demodulation with output means requiring either high current or high voltage output signals.

According to the present invention, a second-harmonic type flux-gate magnetometer is provided with a reference transducer, which is completely shielded from external magnetic fields, and at least one sensing transducer. The driving windings of all the transducers are coupled to an excitation or driving source of alternating current of a first or fundamental frequency. The output signal and driving windings of each sensing transducer are arranged so that no output signal is exhibited in the absence of an external magnetic field, but an output signal having a fundamental carrier frequency of twice the excitation or driving frequency is exhibited when an external magnetic field is present. The reference transducer is biased by a direct current field to present a phase reference signal of twice the excitation frequency at all times. The sensed output signal has an amplitude proportional to the flux density of the sensed field, and also has a phase relationship to the reference signal corresponding to the polarity of the sensed field relative to the reference bias field. Each output winding, including that of the reference transducer, is coupled to a bandpass amplifier having a resonant output circuit tuned to twice the excitation frequency. A phase switching circuit, preferably a phase-detecting ring demodulator, is coupled between the output circuits of the phase reference channel and the sensed signal channel for phase comparison of the sensed signal and the reference signal whereby the direction of response of an output means is controlled. Such output means is responsive to the amplitude of the detected signal as well as its detected phase. When used as a differential gradiometer, a second sensing transducer is employed with identical signal-channel circuitry as described above with the exception that the output means includes a subtractor for deriving an indication proportional to the difference in amplitudes of the sensed output signals. By applying appropriate filters and feedback arrangements, the magnetometer and gradiometer become extremely sensitive to changes in external fields at rates within rate-of-change ranges which can be predetermined by band-pass selection and discrimination.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a schematic diagram of a magnetometer in accordance with the present invention;

FIGURE 2 illustrates the transfer characteristic obtainable by the devices of the present invention;

Figure 3:
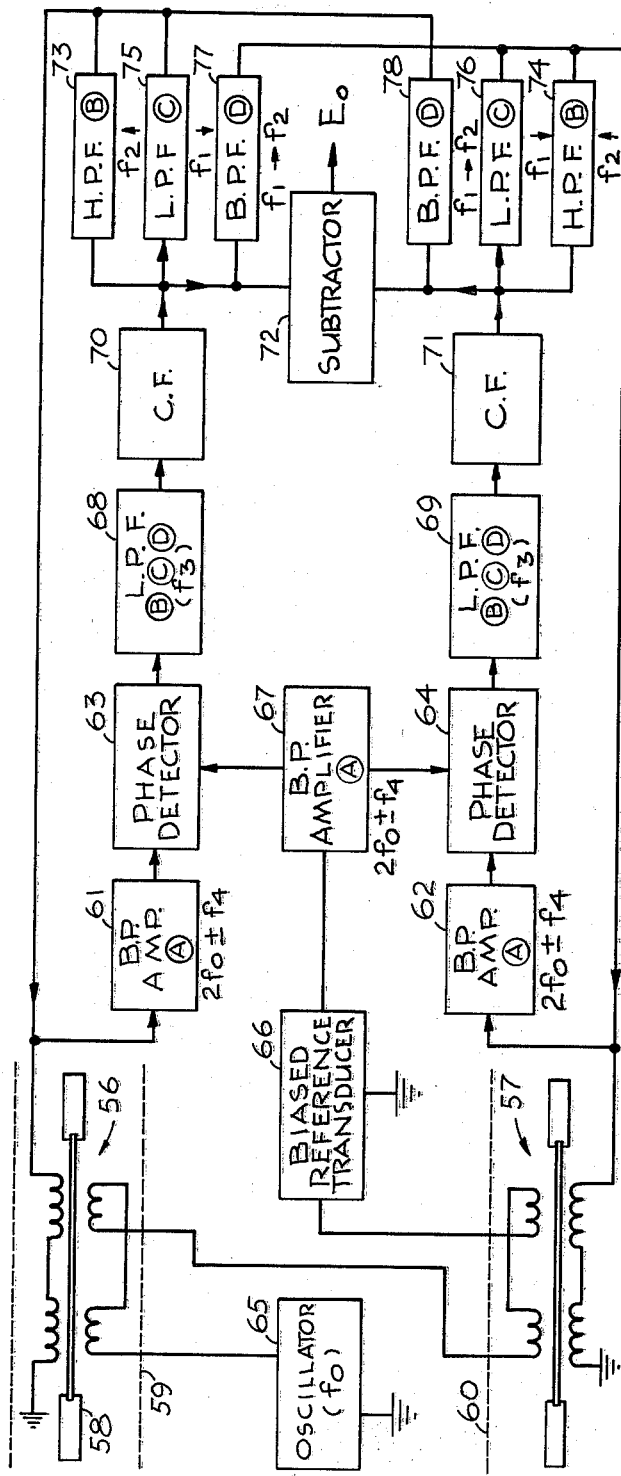
FIGURE 3 is a block diagram, partially schematic, of a gradiometer with phase detection and employing a feedback arrangement in accordance with the present invention.

Referring to FIGURE 1, there are seen a sensing transducer 10 and a reference transducer 11, each having a magnetically saturable element 12 and 13, respectively, in the form of a strip which may be composed of Mu-metal, molybdenum Permalloy or other materials, the strip having a small cross-sectional area. Preferably, the maximum signal flux from the indicated external field H through the saturable element 12 should be about two-thirds of the saturation flux density for the element 12. Applicant has found that, when measuring the earth's magnetic field and using the above-indicated materials for the saturable elements 12 and 13, a strip having a cross-sectional area of about 0.00006 square inch could be used to obtain maximum dynamic range and signal-to-noise ratio in the system. The sensing transducer 10 is provided with a pair of series-opposing balanced driving windings 14 and 15 which are spatially separated along the length of the element 12 so that each of the windings 14 and 15 saturates its corresponding short section of the element 12 simultaneously in opposite directions. The same function is obtained by the identical driving windings 16 and 17 of the reference transducer 11. All of such driving windings are series-connected to each other and to an excitation or driving source 18 which supplies an alternating current of a first or excitation frequency $f_0$. By virtue of the series coupling of the driving source 18 to the various driving windings, the excitation current is the same through each of the driving windings of the several transducers. The reference transducer 11 is provided with a pair of output signal windings 19 and 20 connected in series-aiding relationship and spaced to lie within the range of the driving windings 16 and 17, respectively. D.-C. bias means 21 is also provided for the reference transducer 11 and may comprise the illustrated series-connected arrangement of bias winding 22, battery 23 and variable resistor 24. This bias can also be obtained by means of a permanent magnet. A shield 25 completely surrounds the reference transducer 11 to prevent any effect by external magnetic fields. The sensing transducer 10 is provided with a pair of series-connected output signal windings 26 and 27 spatially corresponding to the range of their respective driving windings 14 and 15. The output signal windings of the sensing transducer 10 and reference transducer 11 are coupled through capacitors 28 and 29, respectively, to band-pass amplifiers 30 and 31, respectively. In the preferred form illustrated, band-pass amplifiers 30 and 31 comprise respective input inductors 32 and 33, output inductors 34 and 35 and output capacitors 36 and 37. The output signals from the transducers 10 and 11 exhibit a fundamental carrier frequency which is twice that of the excitation frequency of the driving source 18. Preferably, there should be a step-up ratio between the input inductors 32 and 33 and their respective output inductors 34 and 35, the latter comprising resonant output circuits with their respective capacitors 36 and 37, such resonant output circuits being tuned to the aforesaid fundamental carrier signal frequency. A phase switch of the ring demodulator type, indicated generally at 38, attains phase detection and comprises ring-connected resistors 39, 40, 41 and 42 and diodes 43, 44, 45 and 46 in the arrangement shown. Such diodes may be either semiconductor diodes or vacuum diodes arranged with their polarities as shown. The values of the resistors in the ring demodulator 38 should be high enough to present sufficient impedance across the tuned circuits to prevent de-Q-ing thereof. A center-tap 47 on the output inductor 35 of the reference amplifier 31 is grounded. A center-tap 48 on the output inductor 34 of the sensing amplifier 30 is similarly grounded through output indicating means which may comprise either or both of the meters shown. An ammeter 49 is shunted by capacitor 50 and connected in series with variable resistor 51 between ground and the center-tap 48. Similarly, a voltmeter 52 is shunted by a capacitor 53 and connected in series with a resistor 54 between ground and the center-tap 48. Either the ammeter 49 or the voltmeter 52 may be used without the other, and they may be of the moving coil galvanometer type, capable of indicating current flow in either direction in accordance with the detected phase of the external field. Because of the current limiting effect of the high impedance of the ring demodulator 38, the voltmeter 52 arrangement is preferable.

The operation of the device shown in FIGURE 1 may be described as follows. In the absence of an external field H, the voltages induced in the output signal windings 26 and 27 of sensing transducer 10 by the bucking driving windings 14 and 15 will be symmetrical and opposite in phase so that there will be no output signal presented to the corresponding amplifier 30. In the case of the reference transducer 11 on the other hand, the section of the saturable strip 13 under the driving winding 16 will be saturated for a longer portion of a cycle than the section under the other driving winding 17 (when the bias winding 22 has the polarity as shown relative to the indicated polarities of the driving windings 16 and 17) during one cycle of the driving current, and the reverse will occur on the succeeding cycle. The net voltage in the signal windings 19 and 20 then becomes an alternating pulse whose fundamental frequency is twice that of the driving source 18. This phase reference output signal is always present and controls the phase-responsive switching action of the phase detector 38. With the presence of an external field H, the sensing transducer 10 will produce a similar output signal to its corresponding amplifier 30, such sensed output signal having an amplitude proportional to the magnitude of the external field H. The amplitude of the amplified reference signal supplied to the phase detector 38 should be at least twice the amplitude of the maximum amplified sensed signal so that the portion of the sensed signal voltage across any one of the four legs of the detector 38 can never exceed that portion of an opposite polarity reference signal voltage across that same leg. When the external field H has a direction as shown so that it corresponds with the direction of the biasing field of the bias means 21, the voltage induced in the output inductor 34 of the output amplifier 30 will always be in phase with the voltage induced in the reference output inductor 35 of the reference amplifier 31, and the switching action of the phase detector 38 will maintain the current flowing through the output indicators 49 and 52 in the same direction. Upon reversal of the direction of the external field H however, the voltage induced in the output inductor 34 will be opposite in phase to that voltage induced in the reference output inductor 35, and the phase detector 38 will cause the current to flow in the opposite direction through the output indicators 49 and 52. In either event, the indicators will be responsive to, and indicate the magnitude of, the amplified output signal from the sensing transducer 10.

Applicant's investigations have revealed that the transducers described above will have a linear transfer characteristic, as shown in FIGURE 2, with a driving frequency $f_0$ as high as twenty megacycles. However, when utilizing the phase detection system of FIGURE 1, it was found that too high a frequency causes phase shifts with the detected field and that, with Mumetal or molybdenum Permalloy for the saturable element, a five megacycle switching rate was about the upper limit for the over-all system to still maintain the transducer's transfer characteristic of FIGURE 2. However, other materials, such as ferrites, can be utilized at even higher frequencies.

There are certain practical limitations on the upper frequency limits of the switching rate. For example, more driving power is required as the frequency is increased because of eddy current effects. This problem can be minimized by reducing the strip cross-section still further.

The magnetometer illustrated in FIGURE 1 is capable of extremely high gain without loss of linearity. For example, measurements of the earth's magnetic field have resulted in a linear output range of several volts with an excitation power in the vicinity of 100 milliwatts.

Referring to FIGURE 3, there is illustrated a second-harmonic type flux-gate magnetometer of the gradiometer type, showing a feedback arrangement and phase detection system whereby the gradiometer is sensitive to the rate of change of the difference between the two sensed external magnetic fields, rather than merely the differential between the two field intensities sensed by the two sensory elements.

Figure 4:
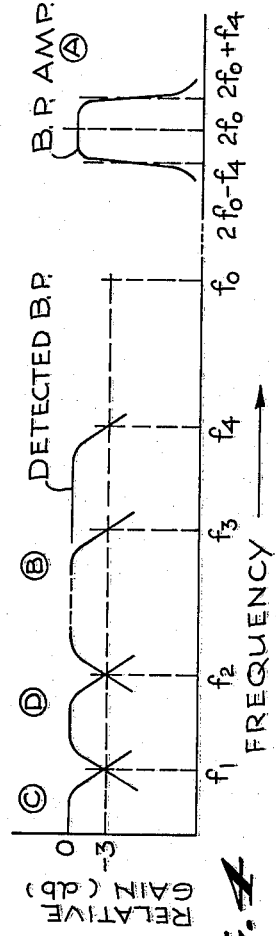
FIGURE 4 illustrates the qualitative frequency response characteristics of the device shown in FIGURE 3.

Referring to FIGURES 3 and 4 together, there is shown a pair of sensing transducers indicated generally at 56 and 57. These transducers are identical to each other and are constructed in accordance with the description of the sensing transducer 10 illustrated in FIGURE 1. Flux-gathering "ears," such as ear 58, may be secured to each end of the sensing strips to yield a theoretically unlimited field sensitivity. These ears may be of ferrite material and of any convenient dimensions. It may be noted that when two ferrite "ears," each being one-half inch in diameter by three inches long and having a permeability greater than 500, are attached to the saturable element of the magnetometer shown in FIGURE 1, such element comprising 4–79 molybdenum-Permalloy of 0.00006 inch cross-sectional area, then the flux-gathering ears will provide sufficient flux to the strip so as to obtain maximum signal output in an external field of 0.02 oersted. The dynamic range of measurable fields is then between 0.02 oersted and 0.02 millionths of one oersted for a bandwidth of one cycle per second, as will be explained later.

The amount of field amplification in the flux-gathering "ears" can thus be selected to any desired value. Ferrite is not necessarily the optimum material. In fact, a bundle of high permeability Mumetal for each "ear" would be preferable when low rate of change gradients are to be measured. Thus, it should be noted that the function of the "ears" is to provide the desired range of field measurements. The lower limit is determined by the Barkhausen noise level and will be a function of the central sensory strip only, assuming that noise generated in the "ears" will not be transmitted to the sensory strip (in general, this is a reasonable assumption). Similarly, the transducer will see no measurable change in output level at field levels above which the central sensory element becomes saturated. Within the limitations of these assumptions, it can then be said that the minimum external field sensitivity of these sensing elements is theoretically unlimited. Practically, from experiments performed, a minimum sensitivity of one milli-micro-oersted or one hundred thousandth of a gamma appears to be achievable when a one cycle per second bandwidth is employed.

In the gradiometer design of FIGURE 3, the transducers 56 and 57 are located a distance apart and are oriented in the same direction. Each transducer is provided with a shield 59 and 60 so as to confine the direction of magnetic pickup desired. The output signals from the sensing transducers 56 and 57 are fed through band-pass amplifiers 61 and 62, respectively, and then to phase detectors 63 and 64, respectively. The driving source 65 may comprise an oscillator having a fundamental frequency $f_0$. The biased reference transducer 66 is the same as illustrated in FIGURE 1, and the driving windings of the reference transducer 66 as well as both of the sensing transducers 56 and 57 are connected in series to the driving source 65 so that the excitation current is identical in all three transducers. The reference output signal from the reference transducer 66 is fed through its band-pass amplifier 67 to each of the phase detectors 63 and 64 for phase detection which is preferably in the same manner as previously described in connection with FIGURE 1. The detected output signals from phase detectors 63 and 64 are then passed through respective low-pass filters 68 and 69 (the cut-off frequency being less than one-half of the bandwith of the band-pass amplifiers 61 and 62) and then into respective cathode followers 70 and 71 for isolation purposes. Cathode followers 70 and 71 preferably have low output impedances for increasing the current of the output signals, thus increasing the current available for the feedback circuits to be described. The output signals from the cathode followers 70 and 71 are then fed to a subtractor 72 which will have an output only when the field seen by one sensing transducer differs from that seen by the other, this being the usual differential type of gradiometer operation. However, in accordance with another aspect of the present invention, the detected output signals are treated differently as hereinafter described.

In order to make the gradiometer sensitive to changing field gradient differences, as sensed by the sensing transducers 56 and 57, within a particular range of rates of change, all output signals from the cathode followers 70 and 71 are fed back to the signal windings of the sensing transducers in what may be called a criss-cross degenerative-regenerative manner. The outputs of cathode followers 70 and 71 are respectively connected to high-pass filters 73 and 74, low-pass filters 75 and 76, and band-pass filters 77 and 78. High and low pass filters 73 and 75 may be combined, or replaced by a band-stop filter. Similarly, a band-stop filter may be substituted for the high and low pass filters 74 and 76. Referring to FIGURE 4 as well as FIGURE 3, in which the circled reference letters A through D indicate the frequency response characteristics of the various amplifiers and filters, the high-pass filters 73 and 74 will pass all frequencies above $f_2$ and the low-pass filters 75 and 76 will pass all frequencies below $f_1$ back to their respective source transducers. Band-pass filters 77 and 78 will pass all frequencies within the selected range of $f_1$ to $f_2$ back to the opposite sensing transducer. Single-section R-C filters are preferably employed. The feedback signals each have a phase inversion of at least 90° and preferably 180° with respect to the external magnetic fields sensed by the respective source transducers. Such phase inversion may be caused to take place anywhere in each signal channel of the system, such as in the band-pass amplifiers 61 and 62. Thus, the feedback signals from the high and the low pass filters to their source transducers always will be degenerative, causing the system to be insensitive to those rates of change of the external fields which give rise to such frequency components. Similarly, when the frequency components in the selected band-pass range of $f_1$ to $f_2$ are the same in each of the sensing transducers, the feedback signals from the band-pass filters 77 and 78 to the opposite source transducers 57 and 56, respectively, will be degenerative, thus effectively cancelling any output signals from the sensing transducers in the absence of a differential rate-of-change of magnetic fields sensed by the two transducers within the selected rate-change. However, when the band-pass feedback frequency components in the selected range $f_1$ to $f_2$ are not the same in each of the sensing transducers 56 and 57, the feedback becomes positive or regenerative and an extremely high system gain results. The feedback ratios and delay times can be selected to prevent oscillations from occurring.

It should be noted that, even if band-pass filters 77 and 78 were omitted, the system would be insensitive to rates-of-change (whether differential with respect to the two sensing transducers or not) outside of the band range $f_2$ to $f_2$ because of the degenerative feedback to each respective source transducer of frequency components outside such range. Frequency components within the range $f_1$ to $f_2$ would not be passed back but, if the rate-of-change within the range $f_1$ to $f_2$ sensed by each transducer is the same (i.e., no differential rate-of-change), such components would cancel each other in the subtractor 72. Of course, a differential rate-of-change sensed by the two transducers within the range $f_1$ to $f_2$ will cause an output indication by the subtractor 72.

By criss-cross degenerative-regenerative feedback of the frequency components within the selected range $f_1$ to $f_2$ by means of the band-pass filters 77 and 78 cross-coupled to the opposite source transducers, the same rates-of-change within the $f_1$ to $f_2$ range will be fed back degeneratively for cancellation at the transducers whereas the differential rates-of-change within such range will be fed back regeneratively for extremely high gain of such selected signals. Thus, there is attained a system which is extremely sensitive to changing field differences within the rate-range defined by the frequencies passed by the band-pass filters 77 and 78, all other changing field differences being cancelled by the degenerative feedback from the high and low pass filters.

The gradiometer illustrated in FIGURE 3 allows the use of sensory elements which saturate in fields well below that of the earth's field at the surface of the earth (that is, in the range of 0.6 oersted). The direct feedback around each amplifier must yield sufficient reversed field so as to allow linear operation of each transducer in any field it sees. For example, if the element saturates at 0.006 oersted, at least 40 db of feedback would be required. Further, if a one cycle per second bandwidth is assigned to the rate-range band (i.e., $f_2$ less $f_1$), then the gradiometer should be sensitive to gradients in this range to field differences of six milli-micro-oersteds. Such sensitivity refers, of course, to all external field sources, including the carrier vehicle. Thus, the practicability of such high sensitivity will depend on this and other considerations.

In use, the system is insensitive to very slowly or very rapidly changing field differences. Thus, if the elements are mounted in an aircraft, a magnetic anomaly (such as a submarine) will give a peak signal when the velocity of the aircraft is within a given range. Also, the effects of fields originating in the aircraft, such as A.-C. motor fields or vibration of the magnetometer elements themselves relative to each other, are minimized.

The gradiometer of FIGURE 3 is illustrated in a form to measure field gradients in one direction only. By appropriate combinations, similar systems may be attained with additional elements which compare the field in a given plane of reference or the total field. In the case of a plane, two elements at right angles to each other and lying within this plane would be required for each position. The net field in a plane can be measured by phase shifting the outputs from the two band-pass amplifiers associated with the two transducers in one plane 90° with respect to each other and then adding the resultant. Comparison between this and the two elements of the other "plane" magnetometer can be made by using one pair for the reference phase in the output demodulator. This arrangement will then be sensitive to both field strength and field direction differences.

The total-field gradiometer requires three sensory elements per module. Cross-coupling of three such systems as illustrated in FIGURE 3 may be attained so as to cancel out false gradients due to twist and roll of the carrying vehicle while increasing the sensitivity to magnetic anomaly gradients. In the event it is desired to operate on high current values rather than high voltage values of the sensed signals from the band-pass amplifiers 61, 62 and 67 prior to phase detection thereof, as may be the case in some applications such as, for example, a total-field gradiometer, the output signals of band-pass amplifiers 61, 62 and 67 may be coupled through cathode followers having low output impedances to the phase detectors 63 and 64 as well as to any additional circuitry needed for such other applications. In such case, the phase detectors 63 and 64 should be low impedance devices. The cathode followers 70 and 71 may be eliminated under those conditions.

Figure 5:
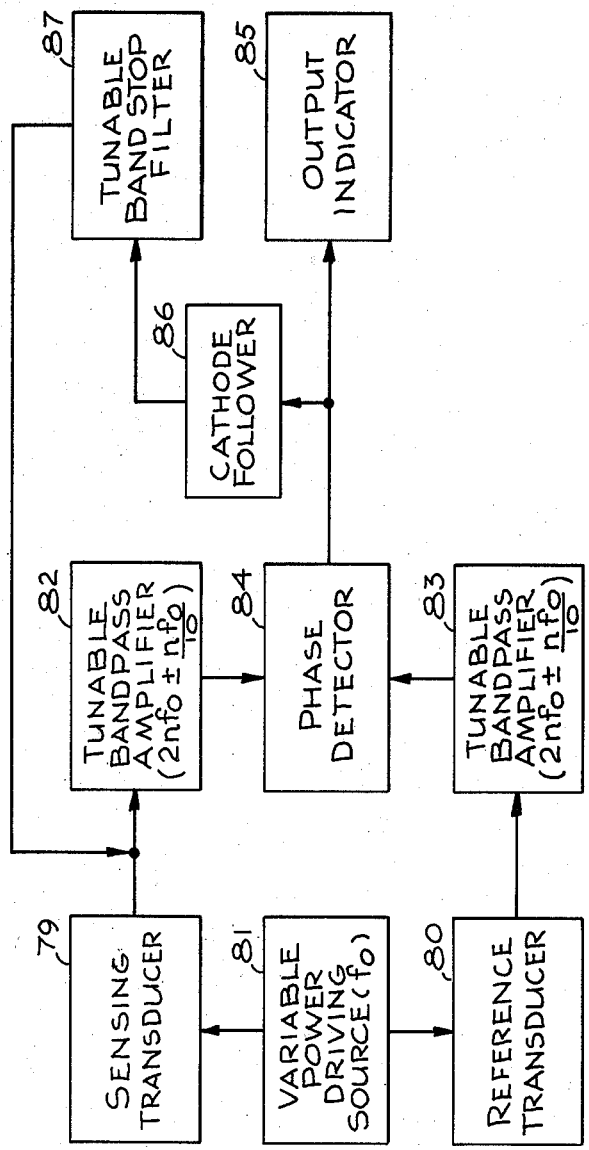
FIGURE 5 is a block diagram of a magnetic field spectrometer in accordance with the present invention.

Turning to FIGURE 5, there is illustrated, in block diagram form, an additional embodiment of the present invention, most of the components being in accordance with their counterparts shown in FIGURE 1. A single sensing transducer 79 and a reference transducer 80 are driven by a common driving source 81 which may be an oscillator exhibiting the fundamental frequency $f_0$. The reference transducer 80 is shielded from external fields and is D.-C. biased. Preferably, for purposes to be described later, the driving source 81 may be varied in its power output for over-driving the excitation windings of the transducers 79 and 80 whereby their output signals will have a carrier signal of higher order even harmonics than the normally obtained second harmonic of the driving frequency $f_0$. The output signals of the transducers 79 and 80 are coupled into respective band-pass amplifiers 82 and 83 which may be tuned filters with step-up inductors as shown in FIGURE 1 having output circuits tuned to the carrier frequency $2nf_0$ of the signals from the transducers. Both amplifiers 82 and 83 are coupled to a phase detector 84, which is preferably of the ring demodulator type shown in FIGURE 1, for producing a phase detected and demodulated output signal to the output indicator 85.

Insofar as the just-described circuitry is concerned, the operation may be the same as described in connection with FIGURE 1.

The phase detected and demodulated output signals from phase detector 84 are coupled through a cathode follower 86 to a bandstop filter 87 tuned to pass all frequency components other than those within a selected band range of $f_1$ to $f_2$. The cathode follower 86 preferably has a low output impedance for increasing the current of the signals fed to the bandstop filter 87. The output signals of the bandstop filter 87 are fed back to the sensing transducer 79 at least 90° and preferably 180° out-of-phase with the external magnetic field giving rise to such signals. Such degenerative feedback causes cancellation of the effects of those external magnetic field components having rise and/or fall times outside of the frequency band range $f_1$ to $f_2$, thus causing the output indicator 85 to indicate signals only within the selected range $f_1$ to $f_2$. Hence, the system illustrated in FIGURE 5, as well as that of FIGURE 3, may be denominated a magnetic field spectrometer because of the limitation of its sensitivity to magnetic field effects within the selected frequency spectrum.

Preferably, bandstop filter 87 is selectively tunable so that the lower and upper frequency limits $f_1$ and $f_2$, respectively, of the stopped band may be selectively varied in accordance with the character of the external magnetic field effects desired to be detected. Thus, if the spectrometer is mounted in an aircraft engaged in searching for magnetic anomalies, such as submarines, the bandstop filter 87 may be tuned in accordance with the aircraft's ground speed to obtain a peak output indication at the predetermined expected rise and/or fall time of the sensed magnetic field change due to such an anomaly. Similarly, in applications involving either passage or dynamic magnetic communication systems, bandstop filter 87 may be tuned for system sensitivity to only those magnetic field changes desired to be received. An additional application, either for military counter-measures purposes or various civilian usages, may be obtained by "sweeping" the bandstop filter 87 through either continuous or stepped frequency spectra, with the output indicator 85 either including or coupled to a panoramic receiver. Various "lock-on" procedures can be utilized, of course, in such frequency sweeping applications.

In the embodiment of the single-sensing-transducer type of spectrometer illustrated in FIGURE 5, the band-pass amplifiers 82 and 83 are both tunable to various even harmonics $2nf_0$ of the driving frequency $f_0$, where $n$ is any integer. Assuming a normal bandwidth of ten percent of the carrier or tuned frequency (i.e., B.P.=$nf_0/5$), the band-pass amplifier 82 will amplify modulating signals having components up to as high as $nf_0/5$. Thus, with a driving source frequency $f_0$ of five megacycles and with the band-pass amplifier 82 tuned to the second harmonic ($n=1$), signals having rise and/or fall times as fast as one microsecond will be amplified for subsequent detection. Of course, the reference band-pass amplifier 83 will be tuned to the same harmonic as the signal channel band-pass amplifier 82, even though modulation is not present, in order to maintain the proper phase reference relationship. Since response times of even shorter duration are required for many applications, the band-pass amplifiers 82 and 83 may be tuned to the fourth harmonic ($n=2$) or even higher. For example, an eighth harmonic ($n=4$) results in a bandwidth $nf_0/5$ of four megacycles, when $f_0=5$ mc., which gives a response time of as fast as 250 milli-microseconds. It should be noted that, as the bandwidth is increased by higher harmonic tuning of the amplifiers, the output signals of such amplifiers will suffer to some extent unless the output signals from the transducers have correspondingly higher-harmonic carrier frequencies. By increasing the power of driving source 81 so as to overdrive the excitation windings of the transducers 79 and 80, a correspondingly higher-harmonic carrier frequency will be obtained, thus permitting a substantially level frequency response characteristic to be attained for the output signals from the band-pass amplifiers 82 and 83. Of course, if the driving frequency $f_0$ is increased to twenty megacycles, operation at high harmonic levels will permit the detection of magnetic field changes having even more extremely fast rise/fall times.

It should be understood that, although the dual-signal-channel embodiment of the present invention illustrated in FIGURE 3 has not been described in terms of tunable operation of the band-pass amplifiers and filters, such operation is readily observed to be inherently available in the FIGURE 3 embodiment in view of the description of the tunable operation in connection with FIGURE 5, and has been omitted for the sake of clarity and the elimination of redundancy. Thus, the various feedback filters 73–78 and the band-pass amplifiers 61, 62 and 67 are preferably tunable in accordance with the teachings in connection with FIGURE 5. Similarly, the driving source 65 is preferably variable in its output power for causing operation of the transducers at higher-order harmonics of the driving frequency $f_0$.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A flux-gate type magnetic field detector comprising: at least one sensing transducer and a reference transducer each having a magnetically permeable element, a pair of balanced driving windings, and output signal windings, said sensing transducer being exposable to external magnetic fields for sensing thereof, and said reference transducer having magnetic bias means for magnetically saturating its respective said element and being shielded against external magnetic fields; a driving source of alternating current of a first frequency coupled to said driving windings; said output signal windings of said reference transducer exhibiting a reference output signal of a second frequency of an even harmonic of said first frequency; said output signal windings of said sensing transducer exhibiting substantially no output signal in the absence of an external magnetic field, and exhibiting a sensed output signal upon the presence of such field, said sensed output signal having a fundamental frequency of said second frequency, an amplitude proportional to the intensity of such field, and a phase relationship to said reference output signal corresponding to the polarity of said magnetic field relative to said reference bias means; a plurality of band-pass amplifiers, each coupled to a respective one of said output signal windings and each having a resonant output circuit tuned to said second frequency; demodulator means coupled to said output circuits for detection of said sensed output signal and phase comparison with said reference output signal; and output means effectively coupled to said demodulator means and responsive to such detected sensed output signal for indicating the phase and amplitude thereof.

2. A magnetic field detector in accordance with claim 1 wherein said first frequency is at least five megacycles per second, said resonant output circuits of said band-pass amplifiers each includes an output inductor, said band-pass amplifiers each includes an input inductor inductively coupled to said output inductor and having a large step-up ratio therewith, and said demodulator means presents a relatively large impedance to said output circuits to prevent de-Q-ing thereof.

3. A magnetic field detector in accordance with claim 1 further comprising frequency-selective filter means effectively coupled between said demodulator means and said sensing transducer and responsive to frequency-selected components of said detected sensed output signal for degenerative feedback of such components to said sensing transducer.

4. A magnetic field detector in accordance with claim 1 further comprising tunable frequency-selective filter means effectively coupled between said demodulator means and said sensing transducers and responsive to selectively variable frequency components of said detected sensed output signal for degenerative feedback of such selected components to said sensing transducer.

5. A magnetic field detector in accordance with claim 1 wherein said resonant output circuits of said band-pass amplifiers are selectively tunable to any one of a plurality of even harmonics of said first frequency.

6. A magnetic field detector in accordance with claim 5 wherein the output power of said driving source is selectively variable for causing said second frequency to be any one of a plurality of even harmonics of said first frequency, and said resonant output circuits of said band-pass amplifiers are selectively tunable to any such one of such plurality of even harmonics.

7. A magnetic field detector in accordance with claim 6 further comprising tunable frequency-selective filter means effectively coupled between said demodulator means and said sensing transducer and responsive to selectively variable frequency components of said detected sensed output signal for degenerative feedback of such selected components to said sensing transducer.

8. A flux-gate type magnetic field detector comprising: a pair of spatially separated sensing transducers, each adapted to sense an external magnetic field and exhibit a sensed output signal having a magnitude proportional to such field; means for detecting each of said sensed output signals; phase-responsive output means for subtracting such detected sensed output signals from each other to indicate the algebraic amplitude difference therebetween; and a pair of frequency-selective feedback networks, each coupling its frequency-selected components of a corresponding one of said detected sensed output signals to its corresponding source, the coupling of at least one of said frequency sensitive components being in degenerative relationship to its corresponding sensed output signal.

9. A magnetic field detector in accordance with claim 8 wherein said feedback networks are selectively tunable.

10. A magnetic field detector in accordance with claim 8 further comprising a pair of band-pass filters, each coupling its passed frequency components of a corresponding one of said detected sensed output signals to the other one of the sensed output signals, such frequency components passed by said band-pass filters and such network-selected frequency components being substantially mutually exclusive of each other.

11. A magnetic field detector in accordance with claim 10 wherein said feedback networks and said band-pass filters are selectively tunable.

12. A flux-gate type magnetic field detector comprising: a pair of sensing transducers and a reference transducer each having a magnetically permeable element, a pair of balanced driving windings, and output signal windings, said permeable elements of said sensing transducers being spatially separated with respect to each other and exposable to external magnetic fields for sensing thereof, and said reference transducer having magnetic bias means for magnetically saturating its respective said element and being shielded against external magnetic fields; a driving source of alternating current of a first frequency coupled to said driving windings; said output signal windings of said reference transducer exhibiting a reference output signal of a second frequency of an even harmonic of said first frequency; said output signal windings of said sensing transducers exhibiting substantially no output signals in the absence of an external magnetic field, and exhibiting sensed output signals upon the presence of such field; each of said sensed output signals from a corresponding said sensing transducer having a fundamental frequency of said second frequency, an amplitude proportional to the intensity of the corresponding sensed field, and a phase relationship to said reference output signal corresponding to the polarity of such sensed field relative to said reference bias means; first, second and third band-pass amplifiers, such first one being coupled to said output winding of said reference transducer and such other ones being respectively coupled to said output windings of said sensing transducers, each of said amplifiers having a resonant output circuit tuned to said second frequency; first and second demodulator means, such first one being coupled to said output circuits of said first and second amplifiers, such second one being coupled to said output circuits of said first and third amplifiers, each of said demodulator means being for detection of its corresponding said sensed output signal and phase comparison with said reference output signal; and output means coupled to said first and second demodulator means and responsive to both of such detected sensed output signals for indicating the algebraic amplitude difference therebetween.

13. A magnetic field detector in accordance with claim 12 further including a pair of band-pass filters and a pair of bandstop filter networks, each of said bandstop filter networks being effectively coupled in output relationship to one of said demodulator means and in degenerative feedback input relationship to said output signal windings of the corresponding said sensing transducer, each of said band-pass filters being effectively coupled in output relationship to one of said demodulator means and in input relationship to said output signal windings of the noncorresponding said sensing transducer, said band-pass filters each passing the same band of frequencies, and said bandstop filter networks each stopping said band of frequencies.

14. A magnetometer in accordance with claim 13 wherein said first frequency of said driving source is at least five megacycles per second, and said band of frequencies passed by said band-pass filters is from zero to at least one megacycle per second.

15. A flux-gate type magnetic field detector comprising: at least one sensing transducer and a reference transducer each having a magnetically permeable element, a pair of balanced driving windings, and a pair of output windings, said sensing transducer being exposable to external magnetic fields for sensing thereof, and said reference transducer having bias means for magnetically biasing its respective magnetically permeable element, said reference transducer being shielded against external magnetic fields; a driving source of alternating current of a first frequency coupled to said driving windings of said sensing and reference transducers; said output windings of said reference transducer exhibiting a reference output signal of a predetermined amplitude and of a second frequency which is substantially double said first frequency; said output windings of said sensing transducer exhibiting a sensed output signal upon the presence of an external magnetic field, said sensed output signal being of said second frequency, and having an amplitude which is a function of the intensity of said external magnetic field being present, and having a phase relationship with said reference output signal which is a function of the polarity of said external magnetic field relative to said bias means; and means coupled to said output windings of said sensing and reference transducers for indicating the presence of said external magnetic field as a function of the amplitudes and phase relationship of said reference output signal and said sensed output signal.

16. A flux-gate type magnetic field detector comprising: at least one sensing transducer having a magnetically permeable element, a pair of balanced driving windings, and a pair of output windings, said sensing transducer being exposable to external magnetic fields for sensing thereof, a driving source of alternating current of a first frequency coupled to said driving windings; a reference signal source including output windings for producing a reference output signal of a second frequency which is substantially equal to twice the frequency of said first frequency; said pair of output windings of said sensing transducer exhibiting a sensed output signal upon the presence of an external magnetic field, said sensed output signal being of said second frequency, and having an amplitude which is a function of the intensity of said external magnetic field being present; a plurality of band-pass filter means, each coupled to a respectively different one of said transducer and reference signal source output windings; and means coupled to said band-pass filter means for indicating the presence of said external magnetic field as a function of the characteristics of said reference output signal and said sensed output signal supplied thereto.

17. A flux-gate type magnetic field detector comprising: at least one sensing transducer and a reference transducer, said sensing transducer being exposable to external magnetic fields for sensing thereof, and said reference transducer being shielded from sensing said external magnetic fields; a driving source of alternating current of a first frequency coupled to said sensing and reference transducers; said reference transducer exhibiting a reference output signal of a second frequency which is substantially double said first frequency; said sensing transducer exhibiting a sensed output signal upon the presence of an external magnetic field, said sensed output signal being of said second frequency, and having an amplitude which is a function of the intensity of said external magnetic field being present, and having a phase relationship with said reference output signal which is a function of the polarity of each of said external magnetic fields with respect to said reference transducer; and means coupled to said transducers for indicating the presence of each of said external magnetic fields as a function of the amplitudes and phase relationship of said reference output signal and said sensed output signal.

References Cited in the file of this patent

UNITED STATES PATENTS

| | | |
|---|---|---|
| 2,406,870 | Vacquier | Sept. 3, 1946 |
| 2,488,341 | Slonczewski | Nov. 15, 1949 |
| 2,861,242 | Teavitt | Nov. 18, 1958 |
| 2,899,637 | Stein | Aug. 11, 1959 |

FOREIGN PATENTS

| | | |
|---|---|---|
| 619,525 | Great Britain | Mar. 10, 1949 |